US011795895B2

(12) United States Patent
Bompoil et al.

(10) Patent No.: US 11,795,895 B2
(45) Date of Patent: Oct. 24, 2023

(54) AIR INTAKE STRUCTURE FOR ENGINE

(71) Applicant: KAWASAKI MOTORS, LTD., Hyogo (JP)

(72) Inventors: Olivier Bompoil, Bayonne (FR); Pierre Corno, Bayonne (FR); Nobuyoshi Kasahara, Shiso (JP)

(73) Assignee: KAWASAKI MOTORS, LTD.

( * ) Notice: Subject to any disclaimer, the term of this patent is extended or adjusted under 35 U.S.C. 154(b) by 309 days.

(21) Appl. No.: 17/136,581

(22) Filed: Dec. 29, 2020

(65) Prior Publication Data
US 2021/0310451 A1 Oct. 7, 2021

(51) Int. Cl.
F02M 35/16 (2006.01)
B62K 11/04 (2006.01)
F02M 35/02 (2006.01)
B60K 13/06 (2006.01)
F02M 35/10 (2006.01)

(52) U.S. Cl.
CPC .......... F02M 35/162 (2013.01); B62K 11/04 (2013.01); B60K 13/06 (2013.01); B60Y 2200/12 (2013.01); F02M 35/02 (2013.01); F02M 35/10013 (2013.01)

(58) Field of Classification Search
CPC ................. F02M 35/162; F02M 35/02; F02M 35/10013; F02M 35/0201; F02M 35/0204; F02M 35/0205; F02M 35/04; B62K 11/04; B62K 25/283; B60K 13/06; B62J 40/10; B60Y 2200/12
See application file for complete search history.

(56) References Cited

U.S. PATENT DOCUMENTS

| | | | | |
|---|---|---|---|---|
| 6,973,912 B1* | 12/2005 | Shimatsu | ......... | F02M 35/10386 123/480 |
| 7,287,503 B2* | 10/2007 | Suzuki | ................ | F02M 35/024 123/184.53 |
| 10,024,279 B2* | 7/2018 | Lee | ........................ | B60K 13/02 |
| 10,589,621 B1* | 3/2020 | McKoskey | ............ | B62K 19/30 |
| 2006/0006011 A1* | 1/2006 | Khouw | .................. | B60K 13/02 180/68.3 |
| 2006/0065225 A1* | 3/2006 | Shimatsu | ............. | F02M 35/112 123/184.55 |
| 2012/0289370 A1* | 11/2012 | Yamanishi | ............. | B60K 17/08 474/93 |
| 2015/0083513 A1* | 3/2015 | Ito | ........................ | F02M 35/112 60/324 |
| 2018/0266371 A1* | 9/2018 | Rotter | .................... | B01D 45/16 |
| 2018/0298856 A1* | 10/2018 | Mackenzie | .......... | F02M 35/088 |

FOREIGN PATENT DOCUMENTS

JP 2009-257295 11/2009

* cited by examiner

Primary Examiner — Grant Moubry

(57) ABSTRACT

An air intake structure for introducing an intake air into an engine includes: a first air intake passage fluidly connected with an air outlet; a second air intake passage branched off from the first air intake passage and having a passage length greater than that of the first air intake passage; and an open-close valve provided in the first air intake passage. The second air intake passage has a portion thereof bent to allow the flow of intake air in one direction reverse to that of the air flowing a different portion thereof. The first air intake passage, the second air intake passage and the open-close valve are provided within an air cleaner.

4 Claims, 8 Drawing Sheets

AIR INTAKE STRUCTURE FOR ENGINE

CROSS REFERENCE TO THE RELATED APPLICATION

This application is based on and claims Convention priority to French patent application No. 2003389, filed Apr. 4, 2020, the entire disclosure of which is herein incorporated by reference as a part of this application.

BACKGROUND OF THE INVENTION

Field of the Invention

The present invention relates to an air intake structure for introducing an intake air therethrough to an engine.

Description of Related Art

In the field of air intake structures for engines, the structure is known which includes composite air intake passages of different tube length and a switching mechanism operable to select one of passages for the flow of air in dependence on the engine operating condition. (See, for example, Japanese Laid-open Patent Publication No. 2009-257295.)

In such an air intake structure as described above, the composite air intake passages and/or the switching mechanism tend to be complicated and bulky in size.

SUMMARY OF THE INVENTION

The present invention has for its object to provide an air intake structure for an engine which is capable of selecting the passage that is optimum for a particular engine revolution number while the structure is simplified.

In order to accomplish the foregoing objective, the air intake structure for an engine in accordance with the present invention introduces air into the engine, and includes: a first air intake passage fluidly connected with an air outlet port; a second air intake passage branched off from the first air intake passage and having a passage length greater than that of the first air intake passage; and an open-close valve, a portion of the second air intake passage being so bent as to allow the direction of flow of air in that portion to be reverse to that in a different portion thereof.

According to this structure, at a low revolution of the engine, the open-close valve is closed to close the first air intake passage. Accordingly, the intake air flows through the second air intake passage that is relatively long in passage length. On the other hand, at a high revolution of the engine, the open-close valve is opened to open the first air intake passage. At this time, most of the intake air flows through the first air intake passage, which is relatively short in length and has a passage loss as compared with that of the second air intake passage. Thus, one of the passages, that is optimum for the particular engine revolution number, can be selected. Also, since the second air intake passage has a portion thereof, which is so considerably bent that the direction of flow of air may be reverse to the direction of flow of air in other portion thereof, the space occupied by the second air intake passage which is longer in can be minimized. In addition, since the first air intake passage is merely provided with the open-close valve, the structure of the switching mechanism can be made simple and compact. Accordingly, compactization of the air intake structure can be realized.

In the practice of the present invention, an inlet area of a first duct, which forms the first air intake passage, and an inlet area of a second duct, which forms the second air intake passage, may partially contact with each other. According to this construction, while the second air intake passage which is long in length is compactly designed, the second air intake passage can be retained with no support member used.

In the practice of the present invention, an air inlet of the second air intake passage may be positioned below an air inlet of the first air intake passage. According to this construction, since the air inlet of the first air intake passage that is used during a high revolution can be set at a high position, the first air intake passage can be easily formed in the downdraft structure. Thereby, the air charging efficiency during a high revolution can be increased.

In the practice of the present invention, the open-close valve referred to above may include a valve body for selectively opening and closing the first air intake passage and a driver element for driving the valve body, and the driver element may be positioned below the valve body. In such case, the first air intake passage may be formed by the first duct that protrudes substantially horizontally from a cleaner casing of the air cleaner. It is to be noted that the term "substantially horizontally" is to be understood as including an area ranging not greater than ±25 degrees from a horizontal direction. According to this construction, while the first air intake passage is positioned above wherever practicable so as to avoid the interference with the driver element, the downdraft structure can be formed easily. Thereby, the air charging efficiency can be increased.

In such case, a second duct forming the second air intake passage, which second duct has been branched off from the first duct, may be accommodated within the cleaner casing. According to this construction, the second air intake passage can be formed compactly within the cleaner casing.

A motorcycle according to the present invention is a motorcycle includes: an air intake structure of the present invention; a rear suspension extending in a vertical direction, an air cleaner disposed rearwardly of the engine, the air cleaner having a cleaner casing that has its front portion protruding forwardly while being displaced in one lateral side of a motorcycle widthwise direction; and an air delivery tube having the air outlet and extending forwardly from the front portion of the cleaner casing, and the rear suspension passes through the other lateral side of the motorcycle widthwise direction of the front portion of the cleaner casing. According to this construction, by the utilization of the space rearwardly of the rear suspension, the length of the second air intake passage can be secured.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

The present invention will readily and clearly be understood from the following detailed description herein set forth in connection with preferred embodiments thereof with reference to the accompanying drawings. It is, however, to be noted that the preferred embodiments of the present invention herein set forth and the accompanying drawings showing such preferred embodiments are only for the purpose of illustration and should not be used to limit the scope of the present invention in any way whatsoever. The scope of the present invention are to be understood as defined by the appended claims. In the accompanying drawings, like component parts shown in the accompanying drawings are designated by like reference numerals throughout the several views thereof.

DESCRIPTION OF PREFERRED EMBODIMENTS

In describing the present invention, the terms "left and right" used hereinabove and hereinafter are to be understood as relative terms descriptive of the left and right sides as viewed from a driver maneuvering a motorcycle. Also, the terms "upstream" and "downstream" that are hereinabove and hereinafter used are to be understood as meaning relative terms descriptive of positions and/or directions based on the direction of flow of the intake air.

Figure 1:
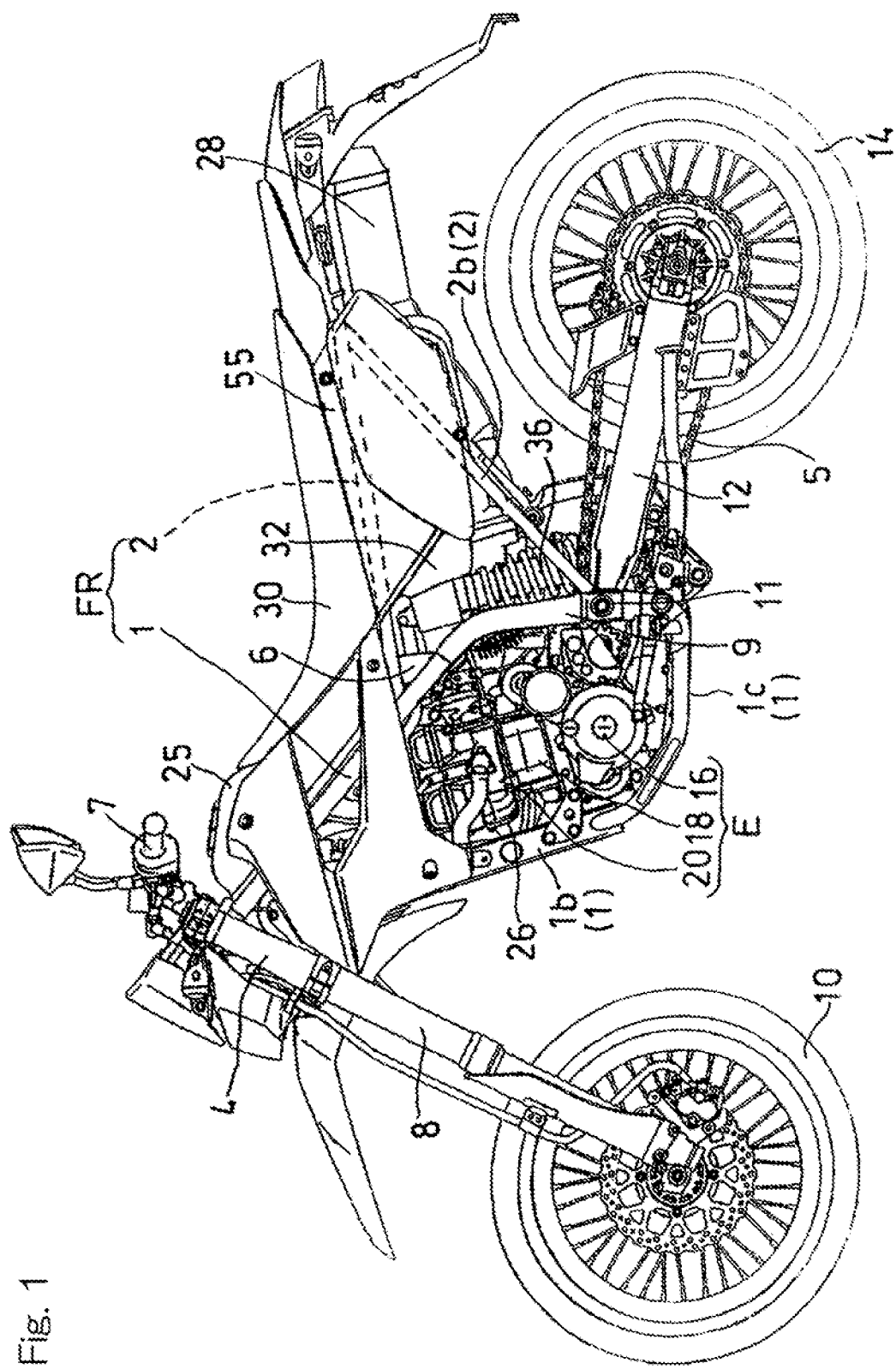
FIG. 1 is a side view showing a motorcycle equipped with an air intake structure for an engine designed in accordance with a first preferred embodiment of the present invention.

FIG. 1 is a side view showing a motorcycle which is one kind of vehicle equipped with an air intake structure for an engine according to a first preferred embodiment of the present invention.

Figure 2:
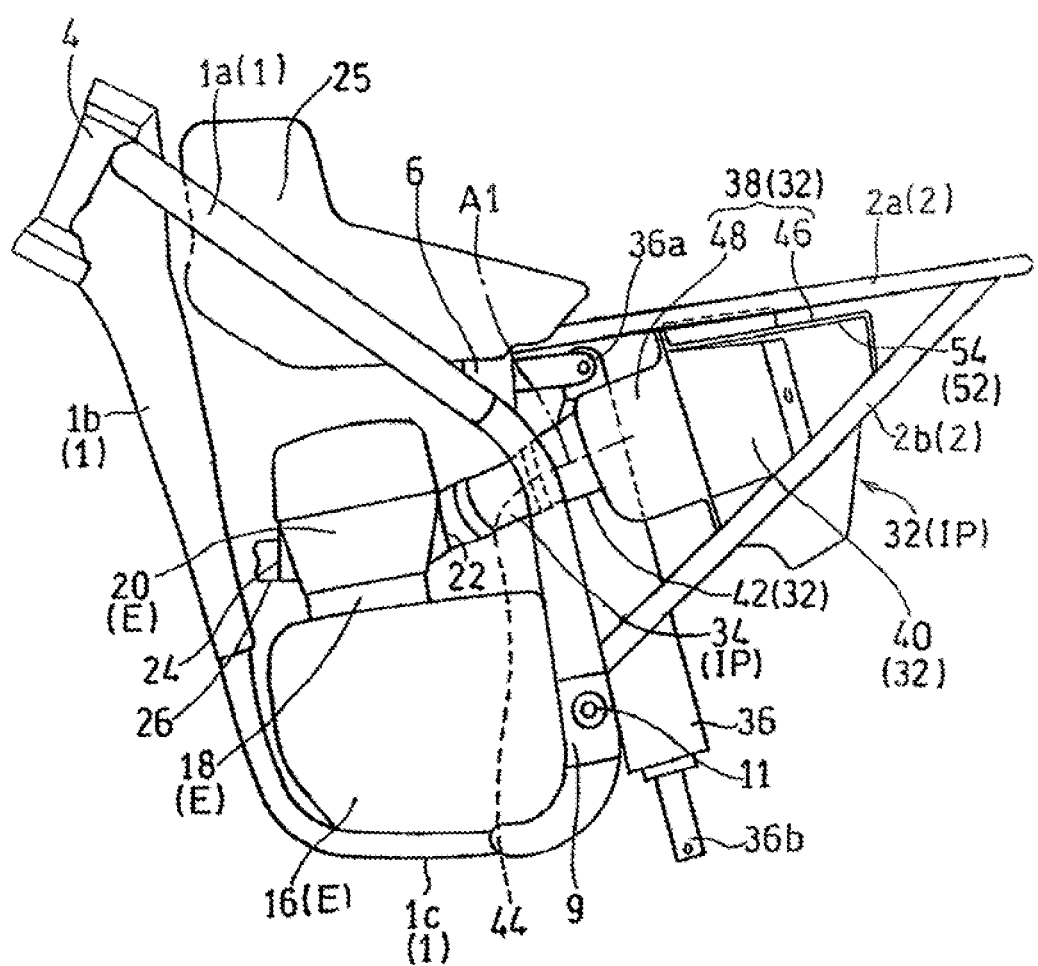
FIG. 2 is a side view showing an important portion of the motorcycle.
Figure 3:
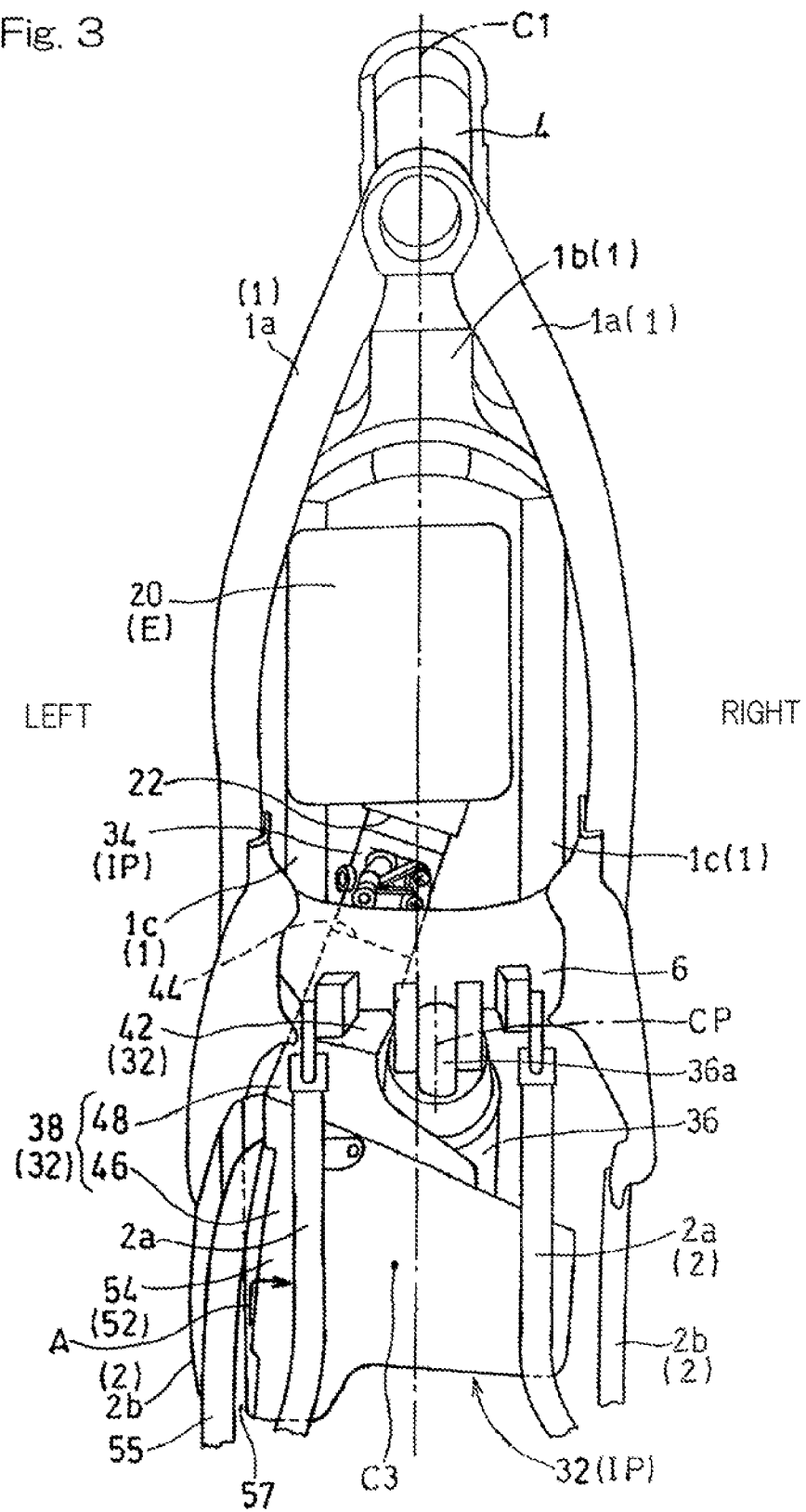
FIG. 3 is top pan view showing the important portion.

A vehicle frame structure of this motorcycle includes a main frame 1 forming a front half structure and a rear frame 2 forming a rear half structure. As shown in FIG. 2, the main frame 1 includes a main frame piece 1a, a down frame piece 1b and an under frame piece 1c. The main frame piece 1a extends from a head pipe 4 at a front thereof in a direction downwardly of and diagonally rearwardly. As shown in FIG. 3, the main frame piece 1a is employed two in number on left and right sides thereof. The motorcycle widthwise span between the left and right main frame pieces 1a and 1a is such as to increases gradually towards the rear from the head pipe 4, and the span from an intermediate portion in a longitudinal direction of a vehicle body to a rear end portion is substantially constant.

Rear portions of the left and right main frame pieces 1a and 1a are connected together through a cross frame piece 6 that extends in a motorcycle widthwise direction. As shown in FIG. 2, the main frame piece 1a has a portion thereof so curved as to extend downwardly from a rear portion of the cross frame piece 6 and then extends substantially downwardly.

The down frame piece 1b extends substantially downwardly from the head pipe 4. The under frame pierce 1c is connected with a lower end of the down frame piece 1b and a lower end of the main frame piece 1a. More specifically, the under frame piece 1c, after having been extended downwardly from the lower end of the down frame piece 1b, further extends rearwardly and is then connected with the lower end of the main frame piece 1a.

The rear frame 2 includes an upper rear frame piece 2a and a lower rear frame piece 2b. The upper rear frame piece 2a has its front end connected with the cross frame piece 6 and then extends rearwardly from the cross frame piece 6. The lower rear frame piece 2b has its front end connected with a lower portion of the main frame piece 1a. The lower rear frame piece 2b extends from the main frame piece 1a in a direction diagonally upwardly and rearwardly with its rear end connected with a rear portion of the upper rear frame piece 2a. In other words, when viewed from lateral side, the main frame piece 1a, the upper and lower rear frame pieces 2a and 2b cooperate with each other to define a triangular shape. As shown in FIG. 3, the upper and lower rear frame pieces 2a and 2b are also employed two in number on left and right sides.

A front fork 8 is rotatably supported by the head pipe 4, shown in FIG. 1, through a steering shaft (not shown). The front fork 8 has its upper end portion to which a handlebar 7 for steering purpose is fixed. The front fork 8 has a lower end portion to which a front wheel 10 is supported.

A swingarm bracket 9 is provided at a rear end lower portion of the main frame 1. A swingarm 12 is supported for vertical movement about a pivot shaft 11 mounted on the swingarm bracket 9. At a rear end portion of this swingarm 12, a rear wheel 14 is rotatably supported.

An engine E is disposed at a position beneath the main frame piece 1a and forwardly of the swingarm bracket 9 and is fitted to the main frame 1. More specifically, the engine E, when viewed from lateral side, is disposed in a space bound by the main frame piece 1a, the down frame piece 1b and the under frame piece 1c. In other words, the engine E is disposed rearwardly of the down frame piece 1b and below the main frame piece 1a and above the under frame piece 1c. This engine E drives the rear wheel 14 by means of a power transmitting member 5 such as, for example, a drive chain. The engine E referred to in the description of the preferred embodiment is a single cylinder four-cycle engine E, but the present invention is not necessarily limited thereto.

The engine E includes a crankcase 16, a cylinder 18 and a cylinder head 20. The crankcase 16 supports a crankshaft (not shown) which is an engine rotary shaft. The crankcase 16 has a rear portion concurrently serving as a mission case. The cylinder 18 protrudes upwardly from an upper surface of a front portion of the crankcase 16. The cylinder head 20 is provided above the cylinder 18. In other words, the engine E, when viewed from lateral side, is of an L-shaped configuration with the crankcase 16 therebelow extending rearwardly from the cylinder 18. The cylinder 18 and the cylinder head 20 are somewhat inclined forwardly. It is however to be noted that the shape of the engine E may not necessarily be limited to that described above.

The cylinder head 20 has a rear surface formed with an air intake port 22 (FIG. 2) and also has a front surface formed with an exhaust port 24 (FIG. 2). The exhaust port 24 has an exhaust pipe 26 fluid connected therewith. The exhaust pipe 26 extends in a laterally right side in a rearward direction and is in turn fluid connected with an exhaust muffler 28 that is disposed in a laterally right side above the rear wheel 14. It is however to be noted that the placement of both of the exhaust pipe 26 and the exhaust muffler 28 may not necessarily limited to those described above.

A fuel tank 25 is supported by the main frame piece 1a. In this fuel tank 25, a quantity of fuel for the engine E is stored. The fuel tank 25 is disposed above the cylinder head 20 of the engine E. At a position rearwardly of the fuel tank 25, a seat 30 is supported on the upper rear frame piece 2a.

At a position below the seat 20 and rearwardly of the engine E, an air cleaner 32 is disposed. Air is introduced into the air cleaner 32 from rear, and then, is filtrates by the air cleaner 32, to thereby be purified. The air purified by the air cleaner 32 is supplied to the air intake port 22 (FIG. 2) of the engine E. The details of the air cleaner 32 will be described later.

Between the air cleaner 32 and the air intake port 22 of the engine E as shown in FIG. 2, a throttle body 34 having a fuel injector is disposed. The throttle body 34 is a sort of fuel supply device for supplying fuel to the engine E. As the fuel supply device, a carburetor may be employed in place of the throttle body 34. As discussed above, the air cleaner 32 and the throttle body 34 cooperate with each other to define an air intake passage IP through which an intake air is supplied to the air intake port 22 of the engine E.

At a location rearwardly of the engine E and below the seat 30 shown in FIG. 1, a rear suspension 36 for the rear wheel 14 is disposed. The rear suspension 36 employed in the practice of the embodiment now under discussion is in the form of a single suspension that is operable to absorb impacts transmitted from the road surface. This rear suspension 36 is suspended between the motorcycle frame structure FR and the swingarm 12 so as to extend substantially in an up and down direction or vertical direction. More specifically, the rear suspension 36 shown in FIG. 2 has an upper end portion 36a connected with the cross frame piece 6, and a lower end portion 36b connected with the swingarm 12 (FIG. 1) through a link mechanism while extending upwardly in a fashion somewhat tilted forwardly.

As shown in FIG. 3, the rear suspension 36 is disposed at a center portion in the motorcycle widthwise direction. More specifically, while the rear suspension 36 occupies a position on a vehicle body center line C1 in the motorcycle widthwise direction, suspension center line CP in the motorcycle widthwise direction occupies a position somewhat on the right side of the vehicle body center line C1. The throttle body 34 is disposed on one lateral side of the vehicle body center line C1, that is, on a left side of the vehicle body center line C1.

The air cleaner 32 shown in FIG. 2 includes a cleaner casing 38, a cleaner element 40 and an air delivery tube 42. As shown in FIG. 3, the cleaner casing 38 has its front portion protruding forwardly at a position offset in one side (leftwardly) in the motorcycle widthwise direction, and the air delivery pipe 42 is fluid connected with a front portion (downstream side) of the cleaner casing 38. The rear suspension 36 passes through the other side (rightward) of the front portion of this cleaner casing 38.

The cleaner element 40 best shown in FIG. 2 is employed in the form of, for example, sponge. It is however to be noted that the cleaner element 40 may not be necessarily limited to that described above. The cleaner element 40 is disposed having been accommodated within the cleaner casing 38, and air flowing through the cleaner element 40 can be filtered. This cleaner element 40 is mounted on a holder 45 (FIG. 5) as will be described later.

The air delivery tube 42 extends forwardly from a front portion of the cleaner casing 38 and is disposed beneath the cross frame piece 6. The air delivery tube 42 is comprised of a tubular pipe. The air delivery tube 42 has an upstream end fitted to a front end (downstream end) of the cleaner casing 38 and, also, has a downstream end connected with the throttle body 34. In other words, the downstream end of the air delivery tube 42 forms an air outlet port 44 in the air cleaner 32. The air delivery tube 42 extends substantially horizontally from the front portion of the cleaner casing 38. It is to be noted that the wording "substantially horizontally" is intended to encompass a region of not greater than ±25 degrees from a horizontal direction. In the case of the preferred embodiment now under discussion, an axis A1 of the air delivery tube 42 is inclined 20 degrees downwardly towards the downstream side (forwardly) of the direction of flow of the air A. In other words, the structure is assumed in which the air A flows downwardly diagonally towards the engine E.

Figure 4:
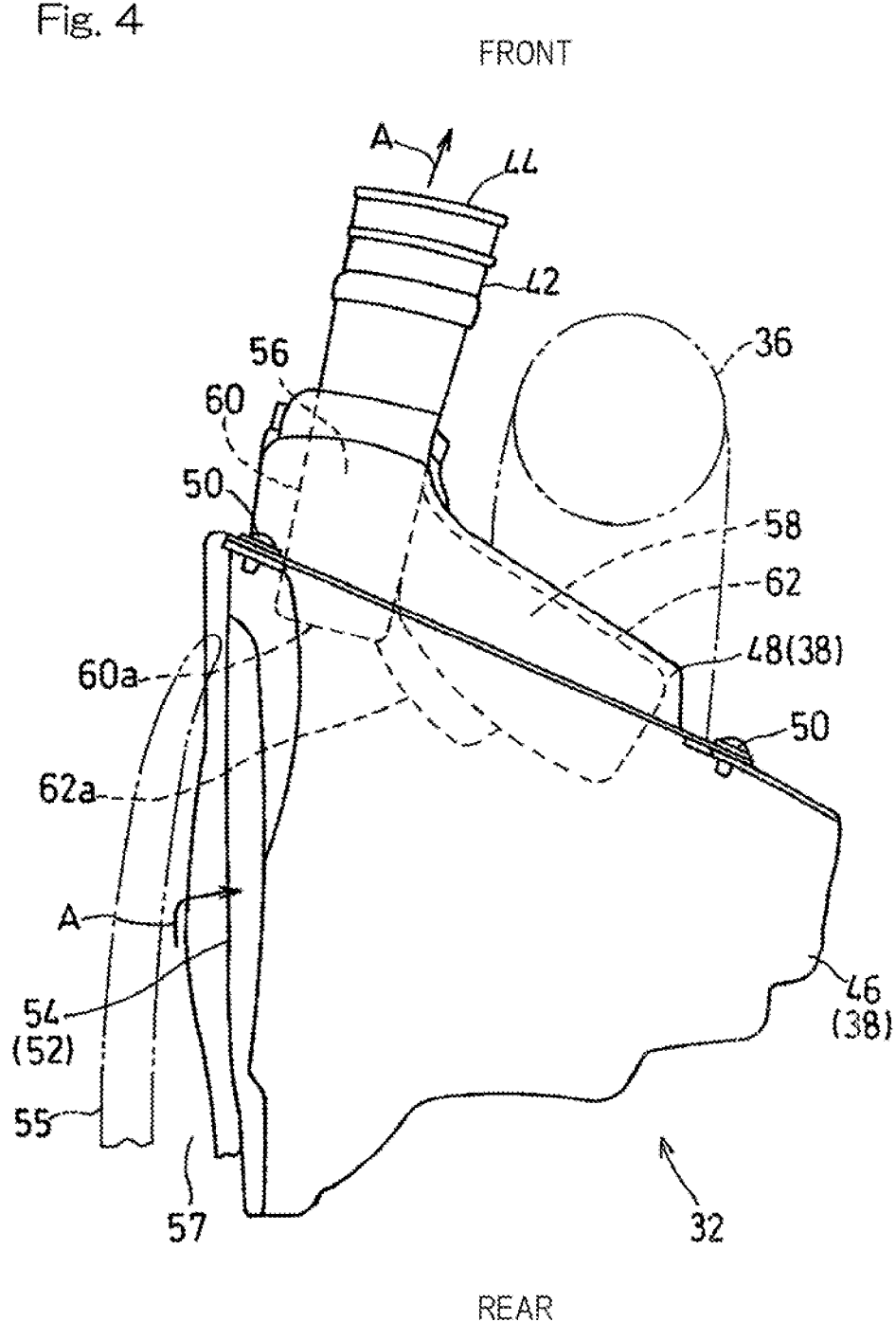
FIG. 4 is a top plan view showing an air cleaner employed in the motorcycle.

The cleaner casing 38 includes a first casing 46 and a second casing 48 as best shown in FIG. 4. The first and second casings 46 and 48 are connected with each other by means of a plurality of first fastening members 50. In the practice of the preferred embodiment now under discussion, the first casing 46 forms a rear half portion to the cleaner casing 38 and the second casing 48 forms a rear half portion of the cleaner casing 38. In other words, the air delivery tube 42 is fitted to the second casing 48.

The first casing 46 is formed with a lead-in opening 52. The lead-in opening 52 is formed in one side portion (left side portion) of the first casing 46 in the motorcycle widthwise direction and is opened in one side (on a left side) in the motorcycle widthwise direction. In the practice of the preferred embodiment now under discussion, the lead-in opening 52 is covered from outside by a side covering 55 shown in FIG. 1. The side covering 55 is removably fitted to the motorcycle frame structure FR. A rearwardly opened gap 57 (FIG. 3) is formed between a rear edge of the side covering 55 and the motorcycle body, and through this gap 57 and an opening 54 the air A is introduced into the cleaner casing 38.

As shown in FIG. 2, in the practice of the preferred embodiment now under discussion, the lead-in opening 52 concurrently serves as an opening 54 which enables insertion and removal of the cleaner element 40. In other words, the air A is introduced into the interior of the cleaner casing 38 through the lead-in opening 52 and also, thanks to the opening 54 (lead-in opening 52), insertion and removal of the element 40 into and from the interior of the casing 38 can be accomplished from the left lateral side. It is however to be noted that the lead-in opening 52 of the air and the opening 54 for the cleaner element 40 may be employed separately.

In the practice of the preferred embodiment now under discussion, the first and second casings 46 and 48 are employed in the form of a molded product of synthetic resin whereas the air delivery tube 42 is made of rubber. It is however to be noted that materials for the air delivery tube 42 and the first and second casings 46 and 48 may not necessarily be limited to that described above. The details of the structure of each of the first and second casings 46 and 48 will be described later.

When viewed from lateral side, the first and second casings 46 and 48 are disposed rearwardly of the main frame piece 1a and the cross frame piece 6 and beneath the upper rear frame piece 2a. Also, most portion of the first casing 46 and an entirety of the second casing 48 are, when viewed from lateral side, disposed between the upper rear frame piece 2a and the lower rear frame piece 2b. More specifically, a portion of the first casing 46 where the opening 54 is formed is disposed between the upper rear frame piece 2a and the lower rear frame piece 2b. Thus, most portion of the first casing 46, which exceeds half of the first casing 46, and the entirety of the second casing 48 are, when viewed from lateral side, disposed within the area encompassed by the triangle defined by the main frame piece 1a, the upper rear frame piece 2a and the lower rear frame piece 2b. A part of the second casing 48 and a part of the air delivery tube 42 are, when viewed from laterally side, overlapped on the rear suspension 36.

Referring to the top plan view shown in FIG. 3, the first and second casings 46 and 48 are disposed between the left and right lower rear frame pieces 2b and 2b. Those first and second casings 46 and 48 are disposed on one side (left side) of the vehicle body center line C1, extending in the longitudinal direction of the vehicle body, which one side is offset in the motorcycle widthwise direction. More specifically, the center line C3 of the first and second casings 46 and 48 (the cleaner casing 38) in the motorcycle widthwise direction is positioned offset towards one lateral side (left side) of the motorcycle widthwise direction relative to the vehicle body center line C1. It is however to be noted that the centerline C3 of the cleaner casing 38 may be disposed so as to coincide with the motorcycle center line C1. The air delivery tube 42 is disposed on a somewhat left side of the vehicle body center line C1.

The air delivery tube 42 is disposed on the left side of the upper end portion 36a of the rear suspension 36. The rear suspension 36 and the air delivery tube 42 are, when viewed from top, disposed between the left and right main frame pieces 1a and 1a. A major portion of the cleaner casing 38 is, when viewed from top, disposed rearwardly of the upper end portion 36a of the rear suspension 36. In other words, a portion of the air intake passage IP, which portion is formed by the air cleaner 32, is formed rearwardly and on one side (leftwards) of the rear suspension 36.

Figure 6:
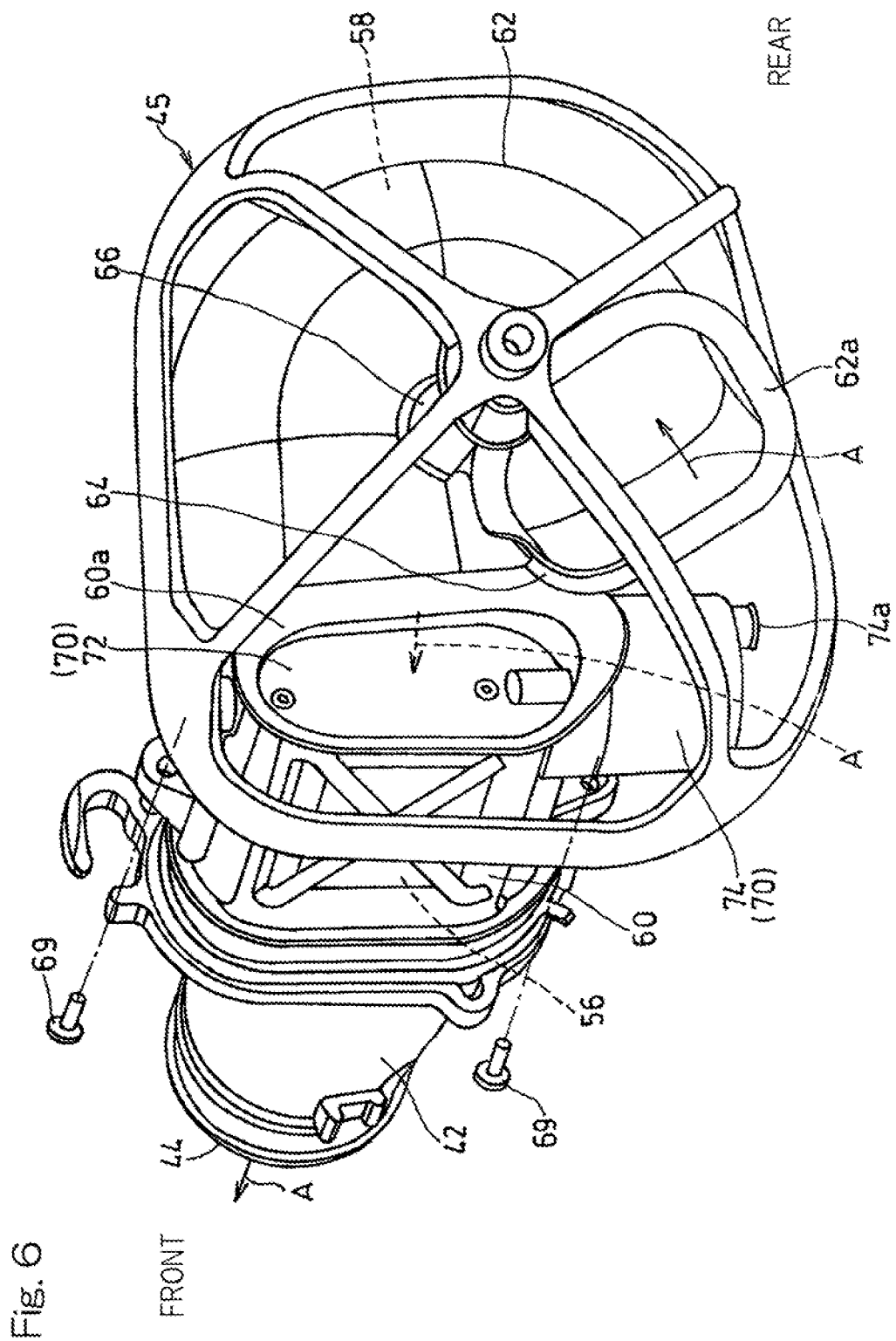
FIG. 6 is a perspective view showing the air cleaner as viewed from diagonally rearwardly and laterally.

As shown in FIG. 4, within the interior of the cleaner casing 38, a first air intake passage 56 communicated with the air outlet port 44 and a second air intake passage 58 ramified from the first air intake passage 56 are formed. The first air intake passage 56 is formed by a first duct 60. This first duct 60 is in the form of a straight tube coaxial with the air delivery tube 42. The first duct 60 protrude from a front wall of the cleaner casing 38 towards the interior of the cleaner casing 38. In other words, the first duct 60 has an upstream end 60a that opens into the interior space of the cleaner casing 38 and, also, has a downstream end 60b fluid connected with the air delivery tube 42. The first duct 60 employed in the practice of the embodiment now under discussion has a transverse sectional surface which represents an oval shape that is elongated in the vertical direction (as shown in FIG. 6). It is however to be noted that the transverse sectional shape of the first duct 60 may not be necessarily limited to that described hereinabove.

Figure 7:
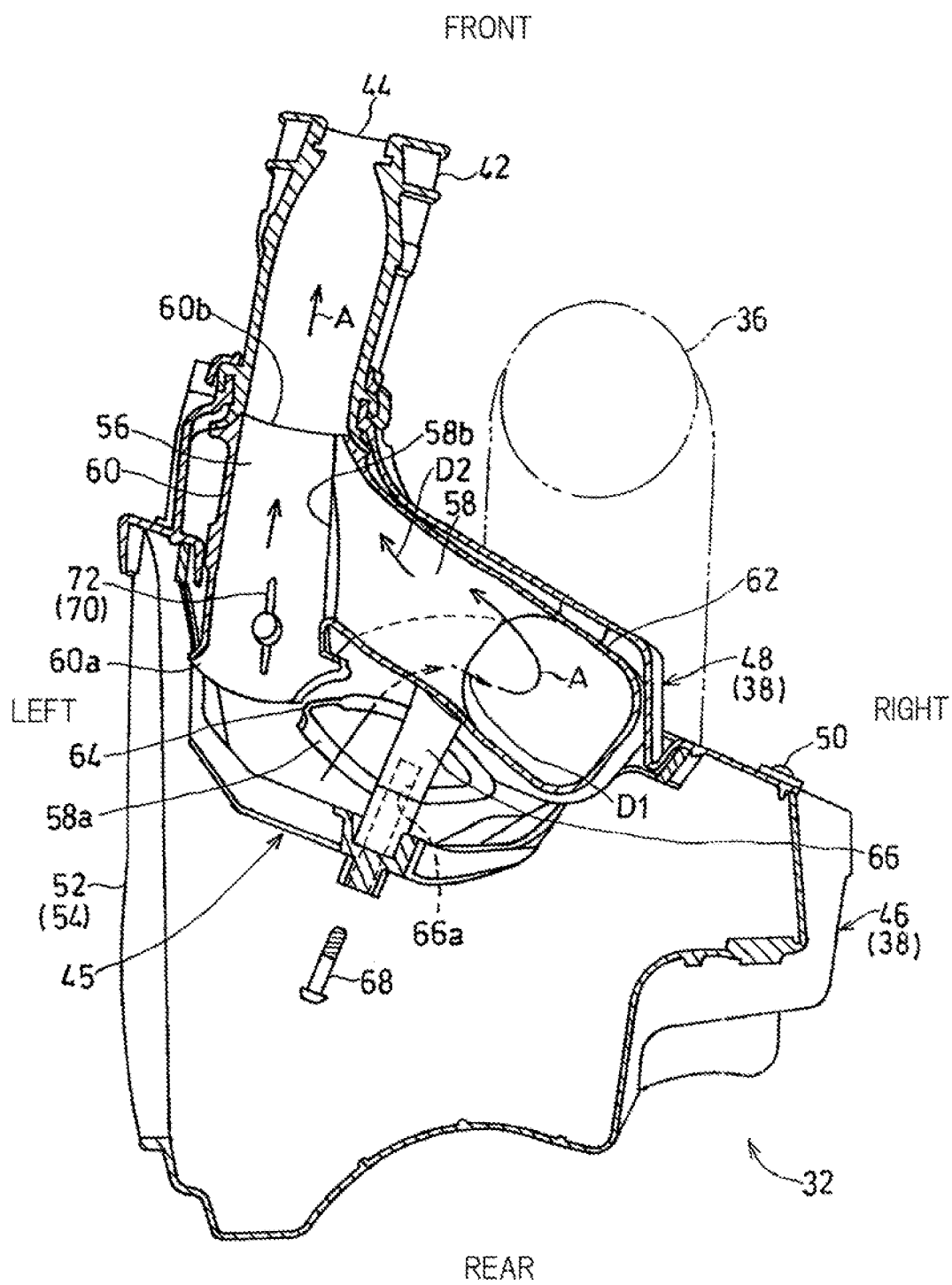
FIG. 7 is a horizontal sectional view showing an air cleaner.
Figure 8:
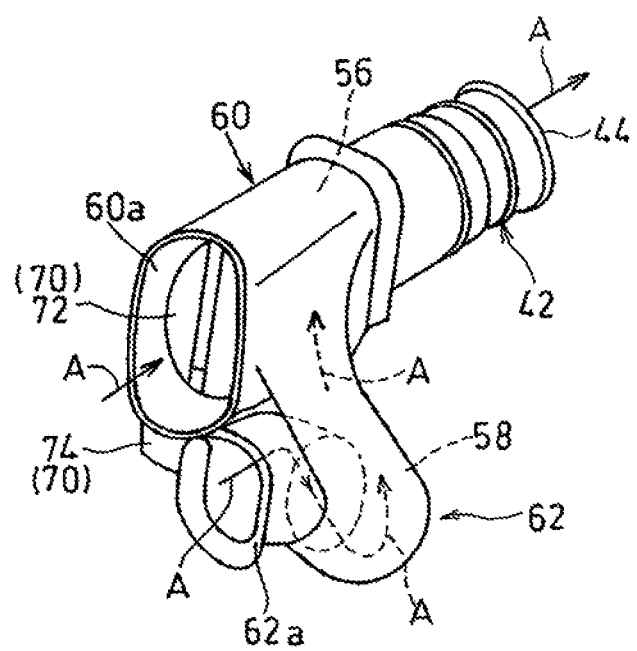
FIG. 8 is a perspective view showing an air intake duct of the air cleaner as viewed from diagonally rearwardly and upwardly.

The second air intake passage 58 is formed by a second duct 62 and has a passage length greater than that of the first air intake passage 56. More specifically, the second air intake passage 58 has a portion thereof so bent relative to the other portion thereof that respective air streams A within those portions thereof may flow in respective directions reverse to each other. In the practice of the present invention, as shown in FIG. 7, the second air intake passage 58 has its upstream end 58a that opens into an interior space of the cleaner casing 38 and, also, has its downstream end 58b that is communicated with the first air intake passage 56. More specifically, as shown in FIG. 8, the second air intake passage 58 is merged with the first air intake passage 56, after it has extended diagonally forwards and rightwards from the upstream end 58a, has then been bent upwardly by 180 degrees so as to extend in a diagonally leftwardly and upwardly and has further inclined slantwise forwardly toward the left side before it is jointed to the first air intake passage 56. In other words, in the upstream region of the second air intake passage 58, the flow of the air A takes place towards the right side, but in the downstream region of the second air intake passage 58, the air flows reversely towards the left side. That is, in the second air intake passage 58, the upstream region and the downstream region have respective air flow directions D1, D2 which have direction components opposite to each other. The shape of the second air intake passage 58 may not be necessarily limited to that described above.

As described above, the air delivery tube 42 shown in FIG. 3 and constituting a part of the air intake passage and passes laterally (leftwardly) of the rear suspension 36. Also, at a position rearwardly of the upper end portion 36a of the rear suspension 36 and above the rear suspension 36, the air cleaner 32 is disposed clear of the rear suspension 36. In this way, by the utilization of a space above and rearwardly of the rear suspension 36 shown in FIG. 4, the air cleaner 32 is disposed clear of the rear suspension 36. Thus, the second air intake passage 58 is so formed in a space above and rearwardly of the rear suspension 36 while avoiding any interference with the rear suspension 36 to thereby secure the passage length.

As shown in FIG. 6, as is the case with the first duct 60, the transverse sectional shape of an inlet area 62a (an upstream end) of the second duct 62 is also an oval shape that is elongated in the vertical direction. The selection of the upwardly and downwardly elongated transverse sectional shapes for the respective passages 56 and 58 is effective to form the two passages 56 and 58 within the space in front of the cleaner casing 38 that is small in motorcycle widthwise direction.

In the practice of the embodiment now under discussion, respective inlet areas of the first and second ducts 60 and 62 are partially brought in proximity to each other via a joint area 64. Accordingly, since it is possible to form those two passages 56 and 58 in proximity to each other, the limited space can be effectively utilized. It is however to be noted that the inlet area of the first duct 60 and the inlet area of the second duct 62 may not be necessarily in proximity to each other.

In the practice of the embodiment now under discussion, both of the ducts 60 and 62 are formed integrally by the use of any known mold forming technique. In the practice of the embodiment now under discussion, a support pillar for holding the holder 45 is, also, formed integrally by the use of any known mold forming technique. Accordingly, the number of component part can be minimized and, also, assemblability can be increased. It is however to be noted that the both ducts 60 and 62 may be formed separately.

As shown in FIG. 7, the support pillar 66 is so formed as to represent such a cylindrical shape as to protrude rearwardly from the second duct 62. This support pillar 66 has a threaded hole 66a formed therein. When a fastening member 68 inserted in the holder 45 is threaded into a threaded hole 66a, the holder 45 is removably fitted to the support pillar 66.

Figure 5:
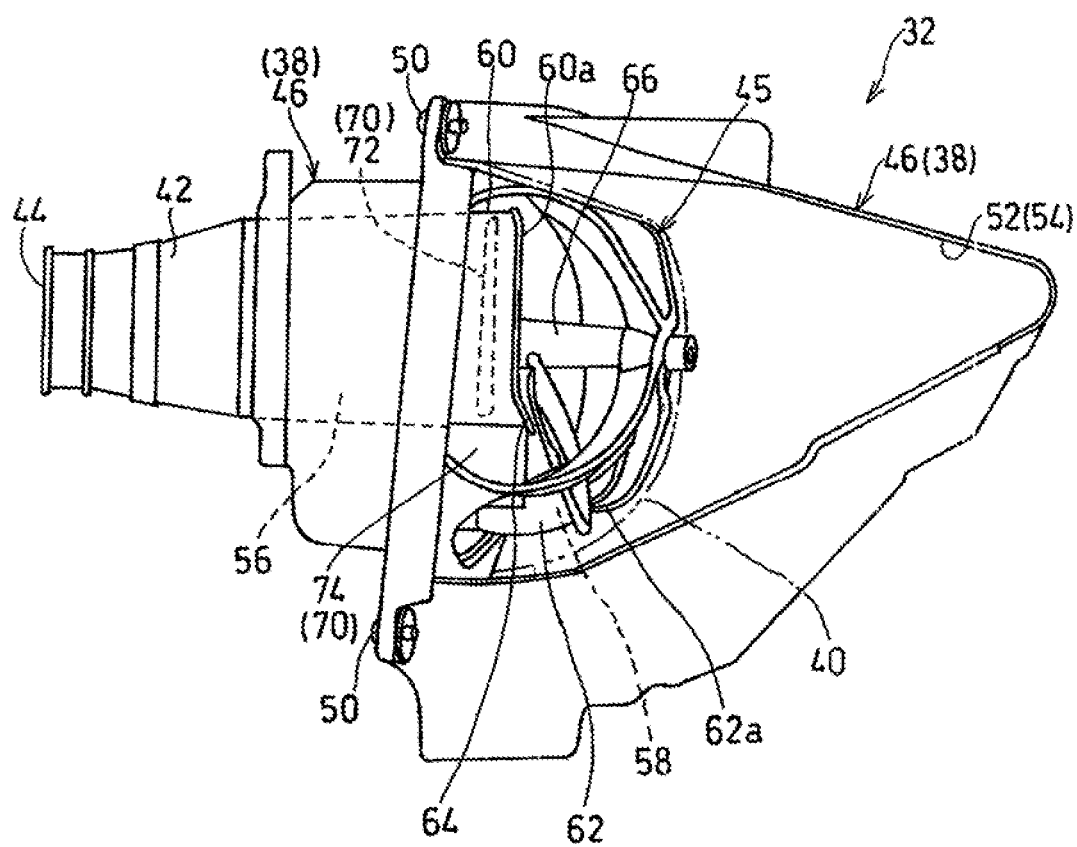
FIG. 5 is a side view showing the air cleaner shown in FIG. 4.

FIG. 5 is a side view showing the air cleaner 32 with the cleaner element 40 in the outside of the holder 45 removed. In FIG. 5, the cleaner element 40 is shown by the dotted-dotted line. As shown in FIG. 5, the air inlet area 62a of the second air intake passage 58 is positioned below the air inlet area 60a of the first air intake passage 56. When the first air intake passage 56 in communication with the air outlet port 44 is positioned on an upper side, a downdraft structure oriented from the air cleaner 32 towards the engine E through the first air intake passage 56 can be easily formed.

As shown in FIG. 7, the first air intake passage 56 is provided with an open-close valve 70. The open-close valve 70 employed in the practice of the embodiment now under discussion is in the form of a butterfly valve. It is however to be noted that the open-close valve 70 may not necessarily be limited to the butterfly valve and may be employed in the form of, for example, a negative pressure valve. The open-close valve 70 includes a valve body 72 for selectively opening and closing the first air intake passage 56 and a driver element 74 for driving the valve body 72 as shown in FIG. 6.

The driver element 74 is positioned below the valve body 72. The open-close valve 70 including the driver element 74 is also accommodated within the cleaner casing 38. The driver element 74 is fitter to an undersurface of the first duct 60. In other words, the first air intake passage 56 is positioned above the driver element 74. Thus, positioning the first air intake passage 56, which is communicated with the air outlet port 44, on an upper side of the first air intake passage 56 makes it possible to form easily the down draft structure that leads from the air cleaner 32 towards the engine E. A removal opening 74a for removing therethrough wiring connected with the driver element 74 is provided in an undersurface of the driver element 74.

The open-close valve 70 shown in FIG. 7 is provided only on the first air intake passage 56 and is not provided on the second air intake passage 58. Also, the open-close valve 70 performs a simple ON/OFF control, and does not perform an opening control (flow control). Accordingly, because of the simple construction and easiness of the control, it can be realized at a low cost.

In the air intake construction according to the embodiment now under discussion, the passage length and surface area of the air intake passage can be changed by means of the selective opening and closure of the open-close valve 70. In other words, an optimum passage appropriate to the operating condition of the engine E can be selected. More specifically, at a low speed, the air A flows through the second air intake passage 58 that is longer in passage length. Accordingly, at the low speed, the force of inertia in the longer passage can be utilized.

At a high speed of the engine E, the open-close valve 70 is subjected to an opening operation, and the first air intake passage 56 is released. At this time, while the second air intake passage 58 is also released. However, since the flow resistance or passage loss of the second air intake passage 58 is high, most of the air A flows through the first air intake passage 56 which has a smaller passage length. At the high speed, since the elongated passage poses a resistance or loss, the first air intake passage 56 is selected with a great deal of importance attached to the amount of air.

The open-close valve 70 is provided only on the first air intake passage 56 and is not provided on the second air intake passage 58. Therefore, even in the generation of an abnormality in the open-close valve 70, at least the second air intake passage 58 can be usable. Accordingly, the operation of the engine E can be continued.

Also, in the practice of the embodiment now under discussion, the valve body 72 is biased at all times to a close position with the use of a spring element (not shown). Accordingly, in the event that the open-close valve cannot be controlled, the first air intake passage 56 is closed and the air flows only through the second air intake passage 58. It is however to be noted that the valve body 72 may be biased at all times to an open position by means of the spring element (not shown). In such case, even when the open-close valve 70 cannot be controlled, the air intake amount can be secured, and therefore, the fall of the performance can be minimized.

In the description that follows, procedures of assemblage of the air cleaner 32 used in the practice of the embodiment now under discussion will be described. At first, the air delivery tube 42 shown in FIG. 7 is mounted on a front portion of the second casing 48 of the cleaner casing 38. Subsequently, a duct structure, in which the first duct 60 and the second duct 62 are integrated together, is brought into abutment with the air delivery tube 42, and the air delivery tube 42, the second casing 48 and the duct structure are bound together by means of a fastening member 69 shown in FIG. 6. Thereby, the air delivery tube 42, the first duct 60 and the second duct 62 are fitted to the second casing 48 of the cleaner casing 38.

Subsequently, the holder 45 is brought into abutment with the pillar 66 which is integrated together with the second duct 62, and the cleaner element 40 (FIG. 5) is mounted on the pillar 66 via the holder 45. In this condition, the fastening member 68 is fastened to the threaded hole 66a in the pillar 66 by means of threading, thereby completing fitting of the fastening member 68, shown in FIG. 7, to the pillar 66. Also, by means of the fastening member 50, the first casing 46 and the second casing 48 are connected together. As herein above described, the air cleaner 32 is thus constructed.

According to the foregoing construction, at the low speed of the engine E, the open-close valve 70, shown in FIG. 7, is closed to close the first air intake passage 56. Accordingly, the intake air A flows through the second air intake passage 58 which is elongated in passage length. On the other hand, at the high speed of the engine E, the open-close valve 70 is opened to release the first air intake passage 56. At this time, most of the intake air A flows through the first air intake passage 56 which poses the lower passage loss than that in the second air intake passage 58. Thus, the optimum passage can be selected in dependence on the number of revolutions of the engine E.

Also, since the second air intake passage 58 is so considerably bent that respective direction of flow of the air A in the upstream and downstream portions may be reverse to each other, the space occupied by the second air intake passage 58, which is elongated in passage length, can be minimized. Also, since the open-close valve 70 is merely provided in the first air intake passage 56, the structure of a switching mechanism can also be compactized. Accordingly, the compactization of the air intake structure can be realized.

The air inlet area of the first duct 60 and the air inlet area of the second duct 62 are partially brought into contact with each other by means of the joint area 64. Accordingly, while the second air intake passage 58 that is elongated is arranged compactly, the second duct 62 can be retained with no support member used.

As shown in FIG. 5, the air inlet area 62a of the second air intake passage 58 is positioned below the air inlet area 60a of the first air intake passage 56. Accordingly, the air outlet port 44 of the first air intake passage 56 that is used during the high speed condition can be set to a high position and, therefore, the first air intake passage 56 can be easily formed into the downdraft structurer. As a result, the air charging efficiency can be improved.

The driver element 74 is positioned below the valve body 72, and the first air intake passage 56 extends substantially horizontally. Accordingly, the downdraft structure can be easily formed while the first air intake passage 56 is, whenever possible, disposed at a high position and interference with the driver element 74 is also avoided. As a result, the air charging efficiency is improved.

The second duct 62 shown in FIG. 7 is accommodated within the cleaner casing 38. Accordingly, the second air intake passage 58 can be compactly formed within the cleaner casing 38.

The cleaner casing 38 has its front portion protruding forwards while having been offset in one lateral side of the motorcycle widthwise direction, and the air delivery tube 42 protrudes forwardly from the front portion of the cleaner casing 38, and the rear suspension 36 extends in the other lateral (right side) side in the motorcycle widthwise direction of the front portion thereof. Accordingly, by the utilization of the space above and rearwardly of the rear suspension 36, the passage length of the second air intake passage 58 can be secured.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, although in describing the preferred embodiment set forth hereinabove reference has been made to the air intake structure for use in the motorcycle, the present invention can be equally applied to any other engine than that in the motorcycle. In addition, the present invention can be also applied to any other engine than that employed in any vehicles. Accordingly, such changes and modifications are, unless they depart from the scope of the present invention as delivered from the claims annexed hereto, to be construed as included therein.

REFERENCE NUMERALS

32 Air cleaner
36 Rear suspension
38 Cleaner casing
42 Air delivery tube
44 Air outlet port
56 First air intake passage
58 Second air intake passage
60 First duct
60a Air inlet area in the first air intake passage
62 Second duct
62a Air inlet area in the second air inlet passage
70 Open-close valve
72 Valve body
74 Driver element
A Intake air
E Engine

What is claimed is:

1. An air intake structure for introducing air into an engine, which comprises:
   a first air intake passage fluidly connected with an air outlet port;
   a second air intake passage branched off from the first air intake passage and having a passage length greater than that of the first air intake passage; and
   an open-close valve provided in the first air intake passage;
   wherein the second air intake passage has a portion thereof that is bent to allow an air to flow in a direction reverse to the flow of air in other portion thereof, and
   wherein an inlet area of a first duct, which forms the first air intake passage, and an inlet area of a second duct, which forms the second air intake passage, partially contact with each other.

2. The air intake structure as claimed in claim 1, wherein an air inlet of the second air intake passage is positioned below an air inlet of the first air intake passage.

3. An air intake structure for introducing air into an engine, which comprises:
   a first air intake passage fluidly connected with an air outlet port;
   a second air intake passage branched off from the first air intake passage and having a passage length greater than that of the first air intake passage; and
   an open-close valve provided in the first air intake passage;
   wherein the second air intake passage has a portion thereof that is bent to allow an air to flow in a direction reverse to the flow of air in other portion thereof,
   wherein the open-close valve comprises: a valve body for selectively opening and closing the first air intake passage; and a driver element for driving the valve body, the driver element being positioned below the valve body,
   wherein the first air intake passage is formed by a first duct which protrudes substantially horizontally from a cleaner casing of an air cleaner, and
   wherein a second duct forming the second air intake passage, which second duct has been branched off from the first duct, is accommodated within the cleaner casing.

4. A motorcycle comprising:
   an air intake structure including:
     a first air intake passage fluidly connected with an air outlet port,
     a second air intake passage branched off from the first air intake passage and having a passage length greater than that of the first air intake passage, and
     an open-close valve provided in the first air intake passage,
     wherein the second air intake passage has a portion thereof that is bent to allow an air to flow in a direction reverse to the flow of air in other portion thereof;
   a rear suspension extending in a vertical direction; and
   an air cleaner disposed rearwardly of the engine, wherein
   a cleaner casing of the air cleaner has its front portion protruding forwardly while being displaced in one lateral side of a motorcycle widthwise direction,
   an air delivery tube having the air outlet extends from a front portion of the cleaner casing, and
   the rear suspension passes through the other lateral side of the motorcycle widthwise direction of the front portion of the cleaner casing.

* * * * *